Figure 1:
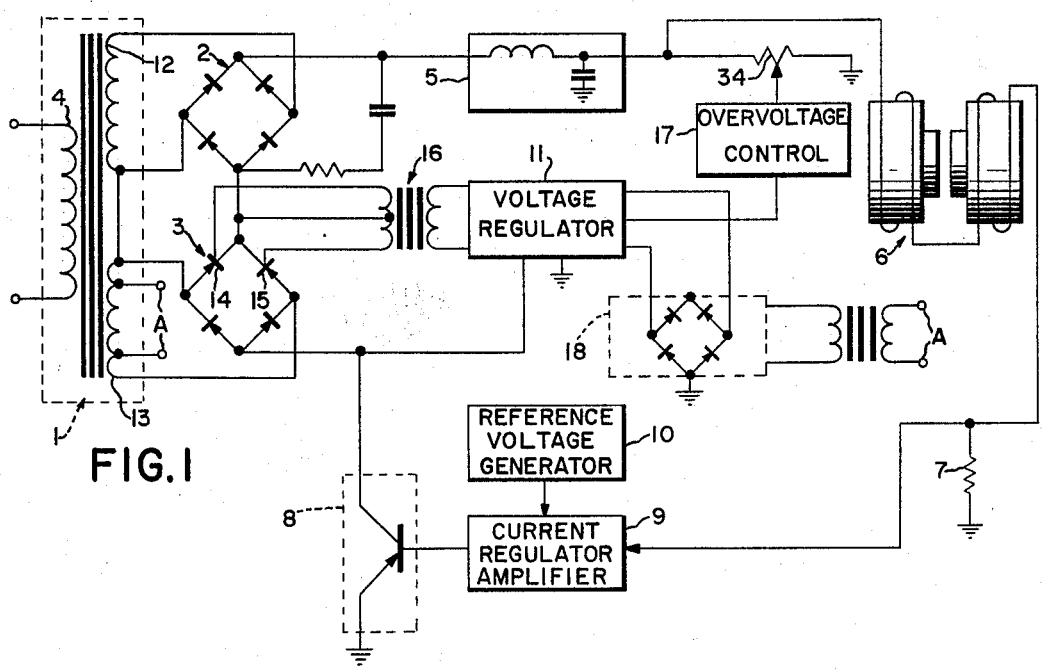

FORREST A. NELSON
GEORGE A. BAKER
BY *Wm J. Nolan*
ATTORNEY

3,286,154
POWER SUPPLY CURRENT REGULATION UTILIZING A SENSING CIRCUIT TO REGULATE POWER TO THE LOAD
Forrest A. Nelson, Palo Alto, and George A. Baker, San Carlos, Calif., assignors to Varian Associates, Palo Alto, Calif., a corporation of California
Filed Apr. 13, 1962, Ser. No. 187,362
5 Claims. (Cl. 321—18)

The present invention relates in general to power supply regulation and, in particular, to a novel circuit to regulate the current output from a power supply of, for example, an electromagnet.

The novel current regulation circuit of the present invention has advantages over power supply regulators which have been used in the past. A high gain current regulator, for example a pass bank of transistors or electron tubes, serves as a control circuit and regulates the current to the load. The voltage drop across the transistor bank was measured and a variac, for example, was used to adjust the input voltage so that voltage drop across the transistor bank was kept within a desired range. The control transistors or electron tubes had to be large enough to handle voltage drops over the complete current range supplied to the load and large enough to handle additional voltage drops due to high frequency line voltage transients which occur from time to time. In order for the control circuit to handle a large voltage drop with its associated heat dissipation, more transistors or tubes were needed to prevent damage to these components.

The power supply of the present invention is regulated so that the voltage drop across the control transistors remains at a constant, optimum level regardless of the amount of current being supplied to the load.

The object of the present invention is to provide circuit means for sensing and adjusting the voltage drop across the control circuit to insure optimum operating conditions thereby reducing the number or the voltage or power capacity of transistors or electron tubes needed in the control circuit.

One feature of the present invention is the provision of a circuit for sensing voltage changes across the transistor bank and automatically adjusting the power supply voltage output to maintain a constant voltage drop across the circuit at an optimum, desired level.

Another feature of the present invention is the provision of a novel voltage control circuit which controls the firing angle of the power supply rectifiers as a function of the sensed voltage to thereby adjust the output voltage of the power supply.

Another feature of the present invention is the provision of controlled rectifiers which facilitate the regulation of the voltage dropped across the control circuit by providing fast, accurate voltage regulation over the power supply.

Another feature of the present invention is the provision of an overvoltage control which detects large changes in the output voltage of the power supply and sends a signal to the voltage regulator to compensate for these changes.

Figure 2:
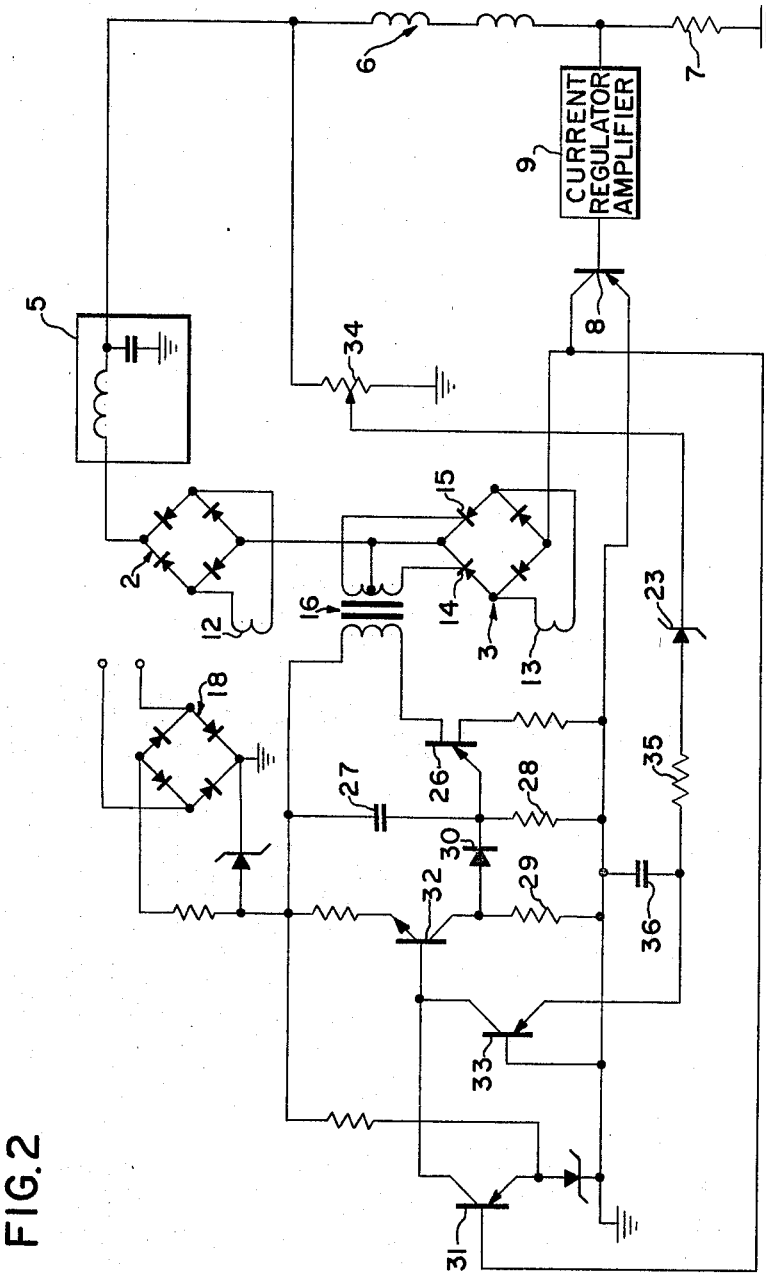

These and other features of the present invention will become apparent upon a perusal of the following specification and drawings wherein:

FIG. 1 shows a power supply for an electromagnet in block diagram form incorporating the novel voltage regulation circuits and controlled rectifiers, and FIG. 2 is a schematic diagram showing the voltage regulator circuits of the present invention which fires the controlled rectifiers.

Referring now to FIG. 1, an A.C. input is fed to the primary windings 4 of a transformer 1, through the secondary windings 12 and 13 to a pair of bridge rectifiers 2 and 3. Bridge rectifiers 2 and 3 convert the A.C. output of transformer 1 to direct current which is filtered by filter network 5 and fed to the load 6, for example, the windings of an electromagnet. To complete the D.C. circuit the current is fed back to the rectifiers 2 and 3 via reference resistor 7 and a control circuit 8, for example, a pass bank of power transistors.

Control circuit 8 in the present embodiment comprises a plurality of power transistors, of which one is shown, connected in parallel and acting as the current regulator for the current supplied to the electromagnet 6. Voltage dropped across a sensor, for example, reference resistor 7, is fed to a current regulator amplifier circuit 9 where it is compared with a reference voltage developed by reference voltage generator 10. An error signal is developed by current regulator amplifier 9 and fed to the base of the transistors comprising the control circuit 8 to regulate the amount of load current. The amount of current passing the control circuit 8 may be controlled by varying the amount of voltage supplied by voltage generator 10 to current regulator amplifier 9. Current regulators of this type are well known in the art.

Voltage regulator 11 is connected in the circuit to detect and measure the voltage drop across the control transistors 8. Voltage regulator 11 produces firing pulses, successive pulses separated by an interval proportional to the voltage drop across the control circuit 8, that is, the more the drop, the longer the interval. Voltage regulator 11 is connected to control rectifiers 14 and 15 of control bridge 3 via transformer 16. The firing pulse produced by voltage regulator 11 controls the firing time of control rectifiers 14 and 15. Delay of the firing pulse controls the conduction angle (firing time within each cycle) of the bridge rectifiers to control the voltage output of the rectifier bridges 2 and 3. The longer the interval between the firing pulses, the less voltage output. The circuit for voltage regulator 11 is fully explained below.

Overvoltage control 17 senses the voltage drop in a resistor 34 connected in parallel with the power supply. The voltage drop in resistor 34 is proportional to the voltage output supply. A signal voltage is fed to voltage regulator 11 which may delay the firing pulse from voltage regulator 11. Large changes in the voltage drop across resistor 34 which could damage the transistors of control circuit 8 are sensed by over voltage control 17 and this information is fed to regulator 11 to delay the firing pulse of voltage regulator 11 as fully explained below.

Rectifier bridge 18 is coupled to the secondary of transformer 1 via coupling A tapped from second winding 13. Bridge 18 is connected to the transistors of regulator 11 to furnish the supply voltage thereto and to synchronize the pulse firing time with alternate half cycles of the A.C. voltage supplied to rectifiers 2 and 3.

FIG. 2 shows in schematic form the circuit of the voltage regulator 11, overvoltage regulator 17, controlled rectifier bridge 3, and rectifier bridge 18.

A unijunction transistor 26 develops a firing pulse to fire controlled rectifiers 14 and 15 of bridge 3, on alternate half cycles of the A.C. line frequency. The output voltage of controlled bridge rectifiers 3 is a function of firing angle delay, the greater the delay, the less output voltage.

At the beginning of each half cycle of line frequency, capacitor 27 is charged by the output from rectifier bridge 18 and fires transistor 26 when its peak emitter voltage is reached. Capacitor 27 forms a long time constant circuit with resistor 28 and a relatively short time constant circuit with resistor 29 through diode 30, so long as diode 30 is forward biased. Most of the initial charging current to capacitor 27 flows through resistor 29 and diode 30 as resistor 28 is in the order of 10 times the size of resistor 29. Transistors 31 and 32 form a two stage direct coupled amplifier of input control voltage from the voltage dropped across control circuit 8. A drop of voltage across transistor 32 due to conduction delays the charging time of capacitor 27 and likewise delays the firing of transistor 26 to increase the firing angle delay thereby limiting output voltage. The delay in the firing time of transistor 26 is a linear function of the input control voltage dropped across transistor bank 8.

Transistor 33 is part of the overvoltage control circuit 17 and has no effect on circuit operation of voltage regulator 11 until the output voltage at the top of resistor 34 reaches the Zener voltage of Zener diode 23. This occurs when a large voltage transient appears in the circuit. Immediately transistors 31 and 32 are biased into conduction to delay firing time of transistor 26 to reduce line voltage. The firing pulse is synchronized with the A.C. input voltage since capacitor 27 is charged at the beginning of each half cycle of line frequency via rectifier bridge 18.

What has been shown is a novel power supply regulator which detects changes in voltage drop across the control transistors and readjusts the power supply voltage output so that the control circuit voltage drop is maintained at its optimum desired level.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A current regulated power supply comprising rectifier means including a controlled rectifier for supplying D.C. power to a load when said controlled rectifier is in a conducting state, current regulating means including a current control circuit for adjusting the current being delivered to said load by said rectifier means, voltage sensing means coupled to said current control circuit for sensing changes in the voltage drop across said current control circuit, and means for generating pulses coupled to said voltage sensing means and responsive to the voltage sensed thereby by generating pulses separated by intervals, said pulse generating means connected to couple said pulses to said controlled rectifier to initiate its conduction, each interval separating pulses proportional to the sensed voltage to maintain the voltage drop across said current control circuit constant.

2. The power supply according to claim 1 further including an overvoltage control to sense the voltage output from said power supply, said overvoltage control electrically connected to said means for generating pulses, said overvoltage control developing a signal when the voltage output of said power supply exceeds a desired level, said means for generating pulses responsive to the signal from said overvoltage control means to adjust the interval between generated pulses thereby adjusting the output of the power supply as a function of said signal.

3. The power supply according to claim 1 wherein the interval between pulses is a linear function of the sensed voltage.

4. The power supply according to claim 1 wherein said rectifier means includes two controlled rectifiers forming one of the arms of said bridge, said means for generating pulses is connected to couple said pulses to initiate conduction of both controlled rectifiers, and said means for generating pulses includes means for delaying the generation of said pulses, the delay being proportional to said sensed voltage.

5. The power supply according to claim 4 wherein said delay means further is connected to an overvoltage control means for initiating the generation of said pulses when the voltage output from said power supply exceeds a desired level.

References Cited by the Examiner

UNITED STATES PATENTS

| | | | |
|---|---|---|---|
| 2,592,615 | 4/1952 | Stone | 321—40 X |
| 2,688,721 | 9/1954 | Bixby | 321—40 X |
| 3,193,753 | 7/1961 | Fleming | 321—18 |
| 3,010,062 | 11/1961 | Van Emden | 321—18 |
| 3,095,534 | 6/1963 | Cockrell | 321—40 X |
| 3,197,691 | 7/1965 | Gilbert | 321—18 |
| 3,218,540 | 11/1965 | Jackson. | |

OTHER REFERENCES

G. E. Controlled Rectifier Manual, first edition, published March 21, 1960, pp. 103–105.

JOHN F. COUCH, *Primary Examiner.*

LLOYD McCOLLUM, *Examiner.*

A. J. GAJARSA, M. L. WACHTELL,
*Assistant Examiners.*